(12) United States Patent
Tesdahl et al.

(10) Patent No.: US 11,950,000 B2
(45) Date of Patent: Apr. 2, 2024

(54) RESOLUTION ENHANCEMENT IN SPATIAL-FREQUENCY SPACE

(71) Applicant: Microsoft Technology Licensing, LLC, Redmond, WA (US)

(72) Inventors: Curtis Alan Tesdahl, Fort Collins, CO (US); James Peele Terrell, Jr., Bellvue, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/930,321

(22) Filed: Sep. 7, 2022

(65) Prior Publication Data

US 2024/0080580 A1 Mar. 7, 2024

(51) Int. Cl.
*H04N 23/957* (2023.01)
*H04N 23/56* (2023.01)
*H04N 23/951* (2023.01)

(52) U.S. Cl.
CPC .......... *H04N 23/957* (2023.01); *H04N 23/56* (2023.01); *H04N 23/951* (2023.01)

(58) Field of Classification Search
CPC ...... H04N 13/282; H04N 23/45; H04N 23/56; H04N 23/80; H04N 23/90; H04N 23/951; H04N 23/957; G02B 3/0056; G06T 3/4053–4076; G06T 2207/20212–20221; G03B 15/02–07
See application file for complete search history.

(56) References Cited

U.S. PATENT DOCUMENTS

| | | |
|---|---|---|
| 9,886,742 B2 | 2/2018 | Perreault et al. |
| 9,993,335 B2 | 6/2018 | Deering et al. |
| 10,268,290 B2 | 4/2019 | Trail et al. |
| 10,629,105 B2 | 4/2020 | Perreault |
| 10,725,292 B2 | 7/2020 | Ollila |

(Continued)

FOREIGN PATENT DOCUMENTS

| | | | |
|---|---|---|---|
| CN | 107645921 A | 1/2018 | |
| GB | 2589121 A * | 5/2021 | ......... G02B 27/4277 |
| WO | WO-2021099761 A1 * | 5/2021 | ......... G02B 27/4277 |

OTHER PUBLICATIONS

Bang, et al., "Lenslet VR: Thin, Flat and Wide-FOV Virtual Reality Display Using Fresnel Lens and Lenslet Array", In Journal of IEEE Transactions on Visualization and Computer Graphics, vol. 27, May 2021, pp. 2545-2554.

(Continued)

*Primary Examiner* — Paul M Berardesca
(74) *Attorney, Agent, or Firm* — Alleman Hall & Tuttle LLP

(57) ABSTRACT

A camera system comprises a lamp configured to emit light, a lamp driver configured to energize the lamp, an image-sensor array configured to acquire image data, a lenslet array, and an image engine. The lenslet array comprises a plurality of lenslets arranged laterally over the image-sensor array and configured to focus the light, reflected from a subject, onto the image-sensor array. The image engine is configured to (a) receive the image data from the image-sensor array, (b) resolve the image data into a plurality of component images, and (c) return an enhanced image based on the plurality of component images, the enhanced image having enhanced spatial resolution relative to any of the component images.

16 Claims, 7 Drawing Sheets

(56) References Cited

U.S. PATENT DOCUMENTS

| | | | |
|---|---|---|---|
| 10,948,873 B2 | 3/2021 | Kim et al. | |
| 2013/0128087 A1 | 5/2013 | Georgiev | |
| 2015/0054979 A1* | 2/2015 | Ou | G02B 21/125 |
| | | | 348/222.1 |
| 2015/0163405 A1* | 6/2015 | Adachi | H04N 23/74 |
| | | | 348/294 |
| 2015/0172575 A1* | 6/2015 | Adachi | H04N 5/265 |
| | | | 348/239 |
| 2016/0088205 A1* | 3/2016 | Horstmeyer | H04N 23/56 |
| | | | 348/80 |
| 2017/0146788 A1* | 5/2017 | Waller | G06T 19/20 |
| 2017/0371159 A1 | 12/2017 | Yoon | |
| 2018/0025207 A1 | 1/2018 | Santos-Villalobos | |
| 2018/0073993 A1* | 3/2018 | Zhao | G06T 7/0004 |
| 2019/0137753 A1* | 5/2019 | Chan | H04N 23/90 |
| 2020/0011995 A1 | 1/2020 | Send et al. | |
| 2020/0150266 A1* | 5/2020 | Cossairt | H04N 5/213 |
| 2020/0285037 A1* | 9/2020 | Horstmeyer | H04N 23/90 |
| 2022/0000362 A1 | 1/2022 | Scheller et al. | |
| 2022/0076379 A1* | 3/2022 | Kleppe | G02B 21/367 |

OTHER PUBLICATIONS

Gerchberg, et al., "A practical algorithm for the determination of plane from image and diffraction pictures", In Journal of Optik, vol. 35, Issue 2, 1972, pp. 237-246.

Gerchberg, et al., "Gerchberg-Saxton algorithm", Retrieved From: https://en.wikipedia.org/w/index.php?title=Gerchberg%E2%80%93Saxton_algorithm&oldid=1039972163, Aug. 21, 2021, 3 Pages.

Mehrabkhani, et al., "Optimization of phase retrieval in the Fresnel domain by the modified Gerchberg-Saxton algorithm", In Repository of arXiv:1711.01176v3, Jan. 29, 2019, 6 Pages.

Pacheco, et al., "Reflective Fourier ptychography", In Journal of biomedical optics, vol. 21, Issue 2, Feb. 18, 2016, 7 Pages.

Zheng, et al., "Concept, implementations and applications of Fourier ptychography", In Journal of Nature Reviews Physics, vol. 3, Mar. 2021, pp. 207-223.

International Search Report and Written Opinion received for PCT Application No. PCT/US2023/030748, dated Dec. 11, 2023, 21 pages.

* cited by examiner

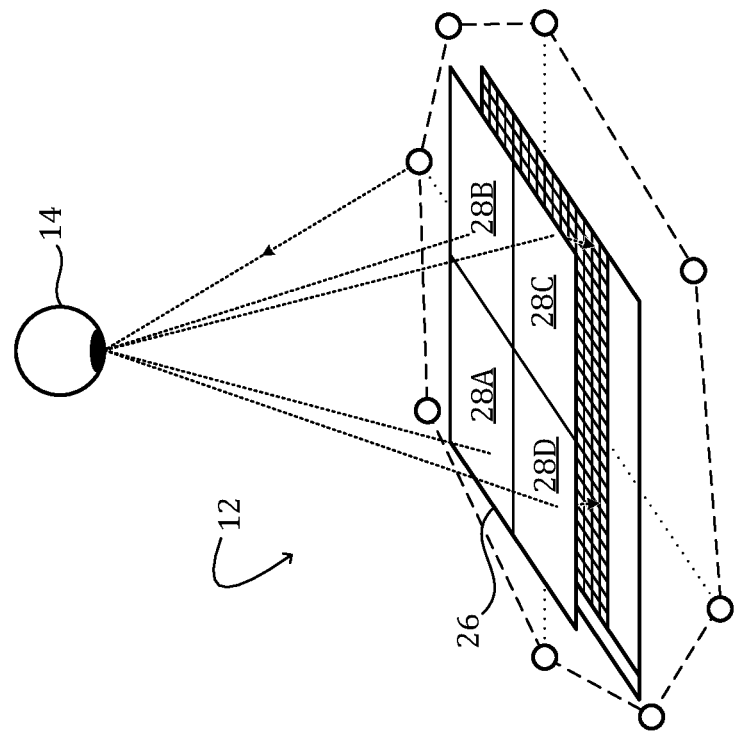
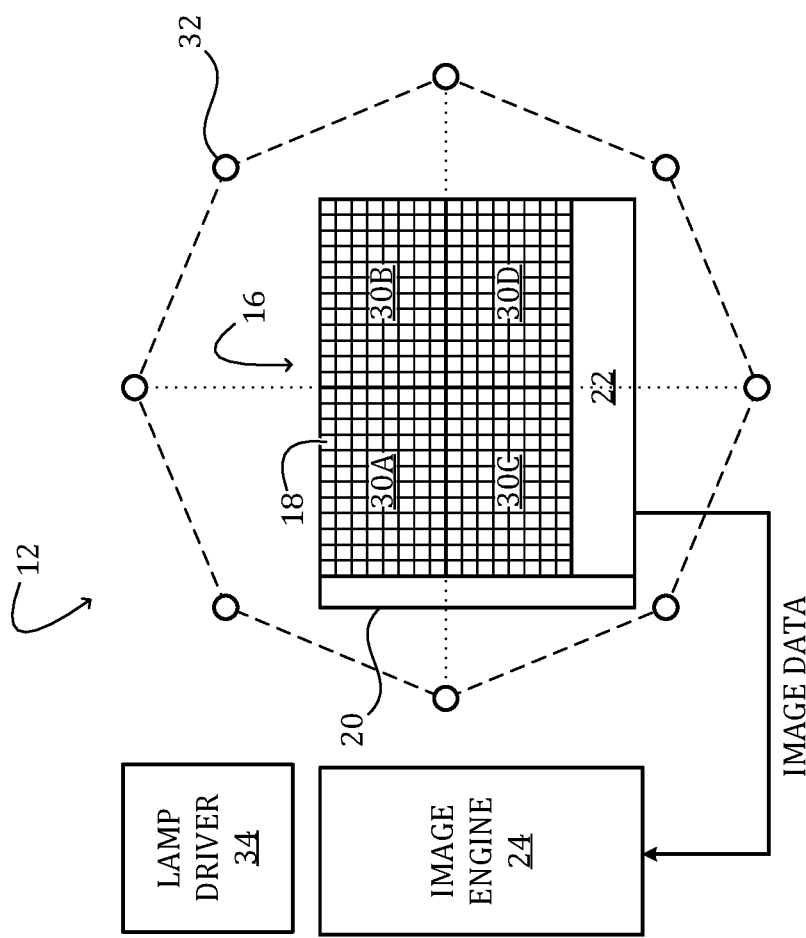
FIG. 2B
FIG. 2A

RESOLUTION ENHANCEMENT IN SPATIAL-FREQUENCY SPACE

BACKGROUND

Over the last 20 years, digital-imaging technology has evolved at a remarkable pace. High-resolution, high-speed, high-sensitivity digital-image sensors are now available at low cost. Digital-image sensors are used in color cameras, for example, and in various other electronic devices targeting the consumer market. Significantly, digital image sensing is not limited to color-camera implementations, but may be used for eye tracking, infrared machine vision, depth vision, and night vision among others.

SUMMARY

One aspect of this disclosure relates to a camera system comprising a lamp configured to emit light, a lamp driver configured to energize the lamp, an image-sensor array configured to acquire image data, a lenslet array, and an image engine. The lenslet array includes a plurality of lenslets arranged laterally over the image-sensor array and configured to focus the light, reflected from a subject, onto the image-sensor array. The image engine is configured to (a) receive the image data from the image-sensor array, (b) resolve the image data into a plurality of component images, and (c) return an enhanced image based on the plurality of component images, the enhanced image having enhanced spatial resolution relative to any of the component images.

Another aspect of this disclosure relates to a method comprising: energizing a lamp of a camera system that emits light onto a subject; acquiring image data recording the light, which is reflected from the subject and focused by a lenslet array arranged laterally over an image-sensor array; resolving the image data into a plurality of component images; and returning an enhanced image based on the plurality of component images, the enhanced image having enhanced spatial resolution relative to any of the component images.

This Summary is provided to introduce in simplified form a selection of concepts that are further described in the Detailed Description. This Summary is not intended to identify key features or essential features of the claimed subject matter, nor is it intended to be used to limit the scope of the claimed subject matter. The claimed subject matter is not limited to implementations that solve any or all disadvantages noted in any part of this disclosure.

BRIEF DESCRIPTION OF THE DRAWINGS

FIGS. 2A and 2B show aspects of an example camera system from different perspectives.

DETAILED DESCRIPTION

Camera systems are used in many different kinds of electronic devices. Two contributors to the cost and size of a camera system are (a) the physical-aperture size, and (b) the number of sensor elements of the image-sensor array. Larger physical apertures require larger objective lenses, which are expensive to fabricate, and providing additional sensor elements naturally increases the cost and size of the image-sensor array. Nevertheless, the physical aperture size and number of sensor elements also control the spatial resolution of a camera system—the number of pixels that the image-sensor array returns (with an acceptable signal-to-noise ratio) at each image capture.

This disclosure provides a solution for increasing the spatial resolution of a camera system having a limited physical-aperture size and a limited number of sensor elements. The camera systems here disclosed acquire plural component images capturing light reflected from the same subject, but shifted in angle space. The shift is provided in part by a lenslet array positioned over the image-sensor array, in place of a unitary objective lens. Due to the offset positioning of the individual lenslets, light reflected from the same subject locus is received at different angles by the lenslets, and the difference is recorded in the component images acquired simultaneously on different quadrants of the image-sensor array. Additional shifting in angle space is achieved by dynamically changing the angle of illumination of the subject as a sequence of component images is acquired. To that end, the camera system may include a series of LED lamps arranged parallel to the image-sensor array; the lamps may be energized one at a time or in any sequence synchronized to the component-image capture.

As the plural component images are acquired, an image engine of the camera system transforms each one onto the spatial-frequency domain and fuses them into a combined image having broader spatial-frequency content than any individual component image. Finally, the image engine inverse transforms the combined image back to the spatial domain, to obtain an image of enhanced spatial resolution.

The solutions herein can be applied across a wide range of devices of limited physical-aperture size and/or number of sensor elements. Particular applications include rear-facing camera systems on handheld and wearable devices, which image the user's eyes to support iris-recognition and eye tracking.

Figure 1:
FIG. 1 shows aspects of an example electronic device.

Turning now to the drawings, FIG. 1 shows aspects of an example electronic device 10. The electronic device includes a camera system 12 configured to image a subject 14. In the illustrated example, device 10 is a near-eye display device, and subject 14 comprises a human eye. More generally, electronic devices consonant with this disclosure include smartphones, tablet computers, laptop computers, game systems, digital cameras, virtual- and augmented reality systems, and various other devices. In device 10 the camera system may be configured for such functions as gaze tracking and/or iris-recognition; in other devices, the camera system may be configured for other purposes.

Camera system 12 may be configured for color imaging, monochrome imaging, hyperspectral (ultraviolet, infrared, or near-infrared) imaging, and/or depth imaging. Envisaged depth-imaging variants include structured-light imaging, time-of-flight (ToF) imaging, stereo imaging, and light-field imaging. In some examples, camera system 12 may be configured to acquire, in rapid succession, a time-resolved sequence of images of the subject—i.e., video.

FIGS. 2A and 2B show aspects of an example camera system 12 from different perspectives. The camera system includes an image-sensor array 16 configured to acquire image data. The image-sensor array comprises a rectangular matrix of sensor elements 18 each responsive to incident photon flux. In some examples the image-sensor array is a complementary metal-oxide silicon (CMOS) array. In one non-limiting example the image-sensor array includes 2560 horizontal rows and 1920 vertical columns of sensor elements. Each sensor element may comprise, in some examples, a CMOS photodiode. Camera system 12 includes a row driver 20 and a readout circuit 22 coupled electronically to the image-sensor array. Row driver 20 is configured to select the row of image-sensor array 16 to be read in the current readout operation. Readout circuit 22 is configured to output an electronic signal varying in dependence on the incident photon flux received by the sensor elements of the selected row. To that end, the readout circuit may be configured to amplify and digitize the charge sensed along each column of the image-sensor array. The readout circuit may include both analog and digital componentry—e.g., plural transconductance amplifiers analog-to-digital converters. In some examples, the readout circuit may include application-specific integrated-circuit (ASIC) componentry.

In the illustrated example, image-sensor array 16 is coupled operatively to image engine 24 via readout circuit 22. The image engine may be an onboard or networked controller for camera system 12 or for the electronic device in which the camera system is installed. In some examples the image engine may include a microprocessor and associated computer memory. In some examples the image engine may include a system-on-a-chip (SoC), or the like.

Camera system 12 includes a lenslet array 26 with a plurality of lenslets 28 arranged laterally over image-sensor array 16 and configured to focus light reflected from subject 14 onto the image-sensor array. Each lenslet is a lens of appropriate size and configuration. For ease of illustration the lenslet array is represented as an opaque layer in FIG. 2B; in reality the lenslet array is substantially transparent, at least to wavelengths imaged by the camera system. The lenslet array typically comprises a rectangular matrix of replicated lenslets. In some examples the rectangular matrix is a two-by-two matrix. Each lenslet 28 of the lenslet array is configured to focus the light reflected from the subject onto a corresponding region 30 (e.g., quadrant) of the image-sensor array. Assuming that the subject is point-illuminated (vide infra), the light reflected from a given locus of the subject is received at a slightly different angle by each lenslet and focused, therefore, onto a non-corresponding sensor element of the corresponding region. Accordingly, the replicated subimages captured concurrently on the several regions 30 are shifted relative to each other.

Camera system 12 includes a series of lamps 32, each configured to emit light when energized (i.e., electrically biased), and a lamp driver 34 configured to energize the lamps. In some examples each lamp comprises one or more light-emitting diodes (LEDs). The emission spectra of the lamps is not particularly limited. For color-imaging applications, the lamps may include blue, green, and red LEDs, or combinations thereof. For depth-imaging and/or near-eye applications, the lamps may include infrared (IR) or near-infrared (NIR) LEDs. In some examples image-sensor array 16 may include a wavelength filter configured to match the emission spectra of the lamps. Typically each lamp has a Lambertian emission profile, which is acceptable for the implementation herein. If desired, suitable focal or beam-shaping optics may be coupled to any, some or all of the lamps, to alter the emission profile.

In the illustrated example the series of lamps includes eight lamps distributed around image-sensor array 16 in a plane parallel to the image-sensor array. In other examples, the lamps may be distributed on different planes, which may not necessarily be parallel to the image-sensor array. In some examples each lamp may be oriented such that the primary ray of its emission profile is normal to the plane on which the lamp sits. In other examples, any, some, or all of the lamps may be oriented such that the primary ray is oblique to that plane, to further vary the angular range of the light emitted from the lamp(s). Still other camera systems may include additional lamps, fewer lamps, differently arranged lamps, etc. In some examples lamp driver 34 is configured to energize the series of lamps in a sequence, so that the angle of illumination of the subject changes as a function of time during image-data acquisition. The lamps may be energized one at a time, for instance.

By virtue of its unique position, each lamp 32 is configured to illuminate a given locus of subject 14 from a different illumination angle, causing light to reflect onto lenslet array 26 at a different reflection angle and be focused, therefore, onto a different sensor element. While a shift in the responsive sensor element would be observed for different illumination points even if only one objective lens were positioned over the image-sensor array, the arrangement of M lenslets turns every such shift into M mutually non-parallel shifts, each one useful for enlarging the effective aperture of the camera system. Among other advantages, the lenslet array reduces the number of individually driven lamps required for a given increase in effective aperture size or image resolution.

In some contexts the term 'resolution' is used merely to quantify the number of pixels of a digital image. In this disclosure, however, 'resolution' refers to the level of granularity of the information content of a digital image, irrespective of the number of pixels used to represent the image. For instance, the resolution of an image acquired by a camera system may be limited by the size of the physical aperture of the camera system and/or the number of sensor elements of the image-sensor array. Up-sampling the image so that the same information spans more pixels does not increase or enhance the 'resolution', as used herein. In the present context, an appropriate quantifier of image resolution is the width of the range of spatial frequencies that represent the information content of the image—viz., frequencies for which the signal-to-noise ratio exceeds a suitable threshold. Accordingly, increasing or enhancing the resolution of an image does not necessarily require (but nor does it proscribe) a corresponding increase in the pixel count. For example, a 500×500 pixel image before resolution enhancement may comprise information signal that descends into noise above a certain spatial frequency. The corresponding image after resolution enhancement may still be a 500×500 pixel image, but one in which the information signal extends to higher spatial frequencies before descending into noise.

In order to provide digital processing for the solutions herein, image engine 24 of camera 12 is configured to (a) receive image data from the image-sensor array, (b) resolve the image data into a plurality of component images, and (c) return an enhanced image based on the plurality of component images, the enhanced image having enhanced spatial resolution relative to any of the component images. The term 'image data' refers herein to any digital image acquired on image-sensor array 16, which may include (due to lenslet array 26) a tiling of plural component images of the same subject. The term 'image data' refers equally to any sequence of digital images of the same subject, which also may include plural component images.

In some examples the plurality of component images resolved by image engine 24 include images acquired concurrently on the different regions 30 of image-sensor array 16. Generally speaking, the number of component images acquired concurrently is equal to M, the number of lenslets 28 in lenslet array 26. In the illustrated example, where the lenslet array comprises four lenslets each arranged over a respective region 30 of the image-sensor array, illumination from a given lamp 32 provides four component images.

In examples in which lamps 32 are energized in a sequence, the image data received by the image engine includes, for each region 30, a sequence of component images where each component image is acquired while a different lamp or combination of lamps is energized. Thus, in scenarios in which each of N lamps are energized one at a time, a total of M×N component images may be resolved—M component images acquired concurrently for each lamp.

Figure 3:
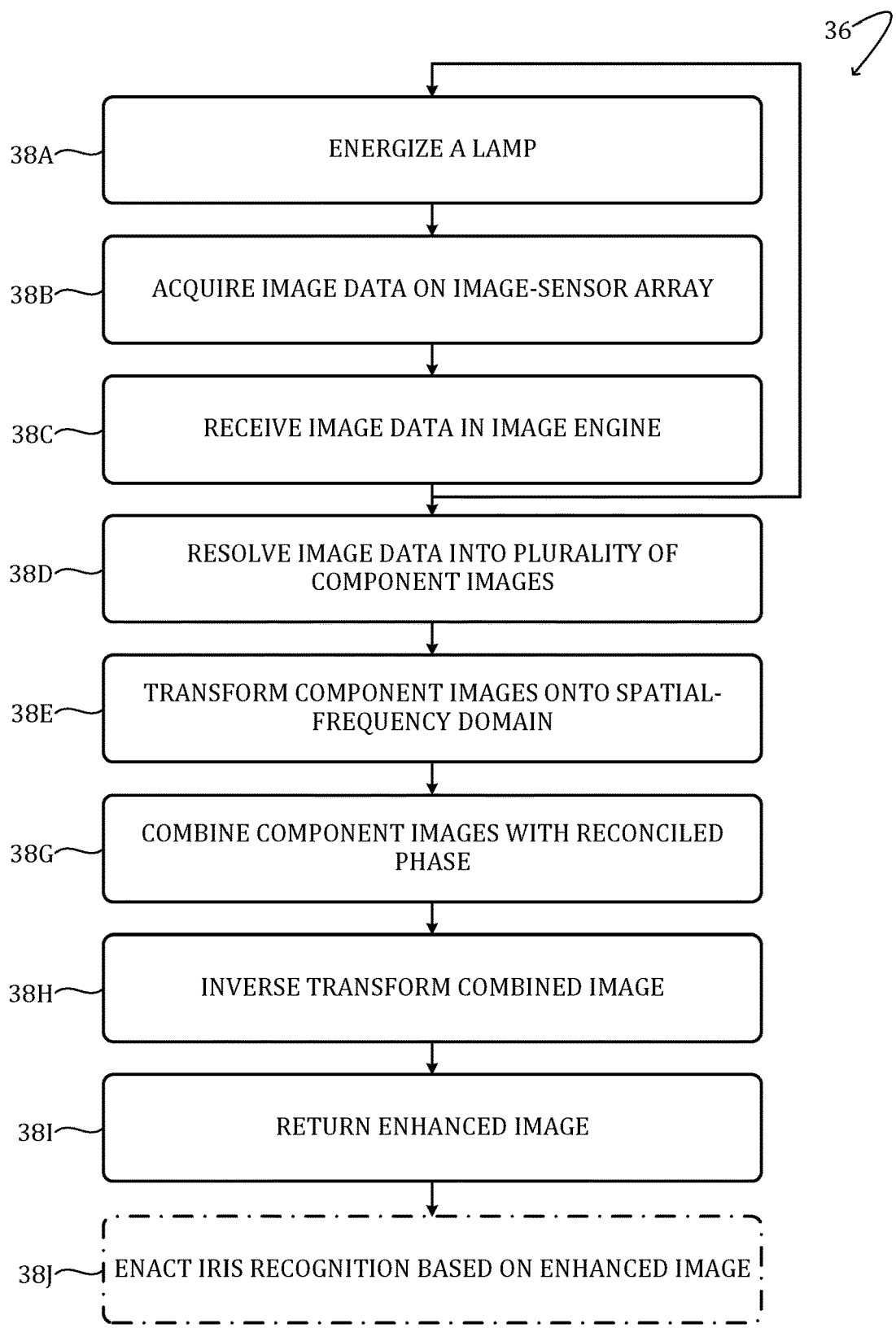
FIG. 3 shows aspects of an example machine-vision method that may be enacted by a camera system or by an electronic device in which the camera system is installed.

FIG. 3 shows aspects of an example machine-vision method 36 that may be enacted by camera system 12 or by the device in which the camera system is installed.

At 38A of method 36 the lamp driver of the camera system energizes a lamp, which emits light onto the subject. In examples in which a series of lamps are provided, the lamps may be energized in any desirable sequence—e.g., one at a time. More particularly, the lamp driver may cycle through a schedule of intervals, energizing during each interval only the one or more lamps associated with that interval, and then proceeding to the next interval.

At 38B the image-sensor array acquires image data recording the light reflected from the subject and focused via a lenslet array comprising a plurality of lenslets arranged laterally over the image-sensor array. In examples in which the lamp driver cycles through a schedule of intervals, as noted above, one image may be acquired during each interval, resulting in a sequence of acquired images where each image in the sequence corresponds to one energized lamp or combination of lamps. At 38C the image engine receives the image data from the image-sensor array.

At 38D the image engine resolves the image data into a plurality of component images. Component-image resolution is achieved in two stages. The first stage applies to examples in which the lamp driver cycles through a schedule of intervals and one image is acquired during each interval. The first stage comprises assigning each image of the sequence to the corresponding lamp or combination of lamps. The second stage includes spatially partitioning every image into plural component images based on the lenslet geometry of the lenslet array.

At 38E the image engine transforms each of the plurality of component images onto the spatial-frequency domain. Every image acquired by the image-sensor array is a function of horizontal and vertical spatial coordinates—viz., sensor-element indices X and Y. Any function of spatial coordinates can be represented alternatively as a function of spatial-frequency coordinates—e.g., $2\pi C/X$ and $2\pi R/Y$, where C and R are the number of columns and rows of the image-sensor array. The terms 'transforming onto the spatial-frequency domain' and 'transforming into spatial-frequency space' refer herein to the act of computing that alternative representation. Typically the spatial-frequency representation is a Fourier representation, but other representations comprising sine, cosine, and/or wavelet basis functions may also be used. For representations comprising real and imaginary parts, such as the Fourier representation, the term 'magnitude' refers to the modulus of the real and imaginary parts. In some examples a 'fast Fourier transform' may be used to transform one or more component images onto the spatial-frequency domain. In other examples a Fresnel transform may be used.

At 38G the image engine combines the plurality of component images in spatial-frequency space to obtain a combined image of broader spatial frequency than any of the component images. In some examples combining the plurality of component images includes accumulating spatial-frequency content from each component image into the combined image using a phase estimate derived from the enhanced image. That aspect is described hereinafter with reference to FIG. 4.

At 38H the image engine inverse transforms the combined image to obtain an enhanced image having enhanced spatial resolution relative to any of the component images. In other words, the combined image initially expressed as a function of spatial-frequency coordinates is transformed into an equivalent function of horizontal and vertical spatial coordinates—e.g., X and Y. To that end an inverse Fourier transform, inverse sine, cosine, or wavelet transform, or inverse Fresnel transform may be applied. In some examples, the effective aperture size for the enhanced image exceeds the physical aperture size of the lenslet array. At 38I the image engine returns the enhanced image. At optional step 38J iris recognition is enacted based on the enhanced image. Iris recognition may be enacted by a dedicated iris-recognition engine of the camera system or of the device in which the camera system is installed.

Figure 4:
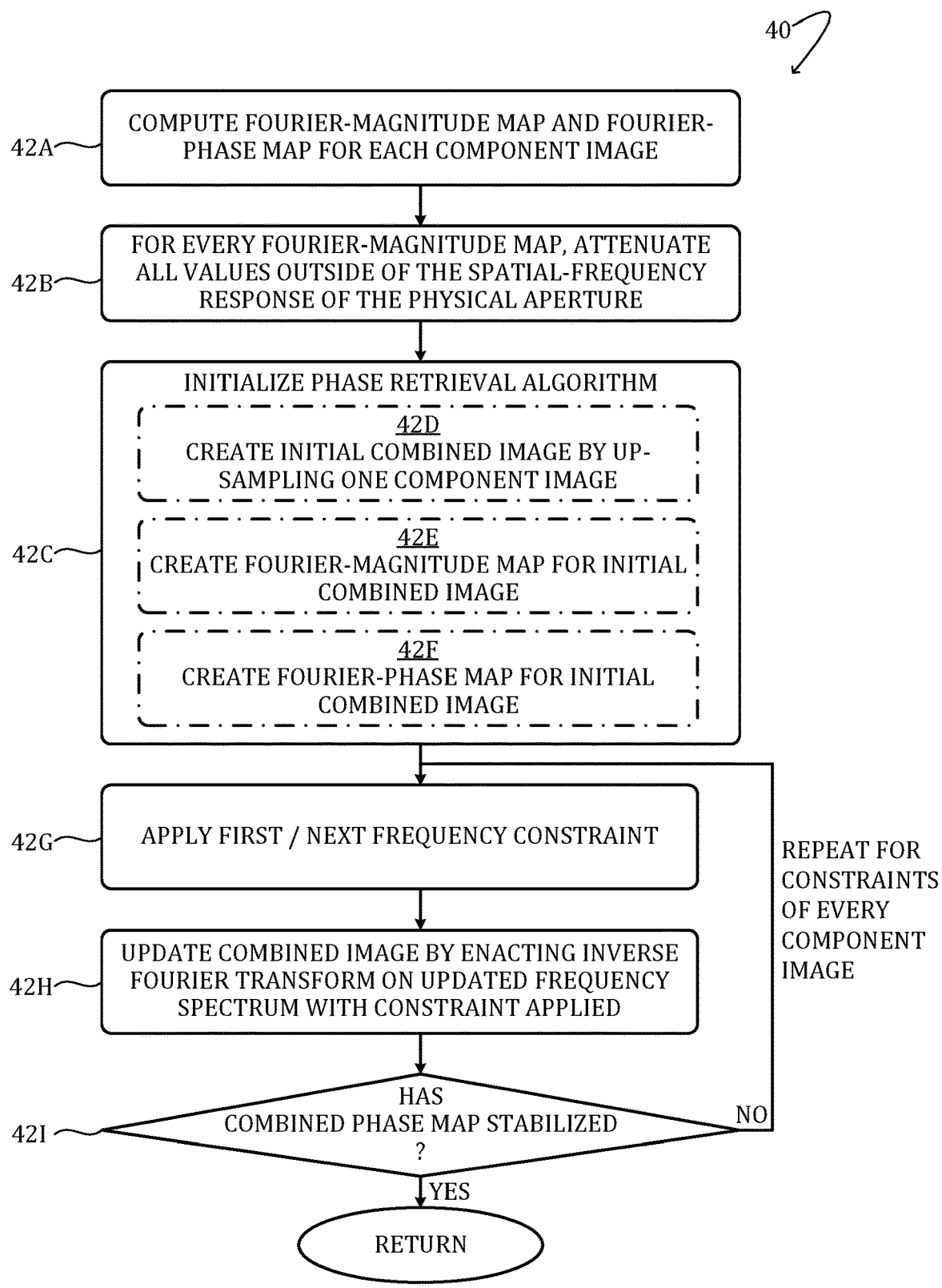
FIG. 4 shows aspects of an example up-conversion method for merging component images into an enhanced image.

FIG. 4 shows aspects of a more particular up-conversion method 40 for merging component images into an enhanced image—viz., an image having enhanced spatial resolution relative to any of the component images.

Figure 5:
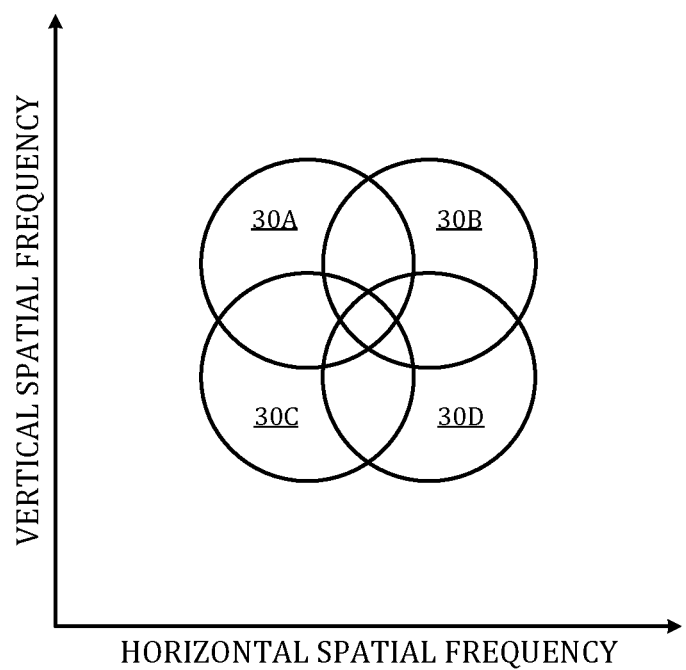
FIG. 5 illustrates an example overlay of Fourier-magnitude maps based on concurrently acquired component images under single point illumination.
Figure 6:
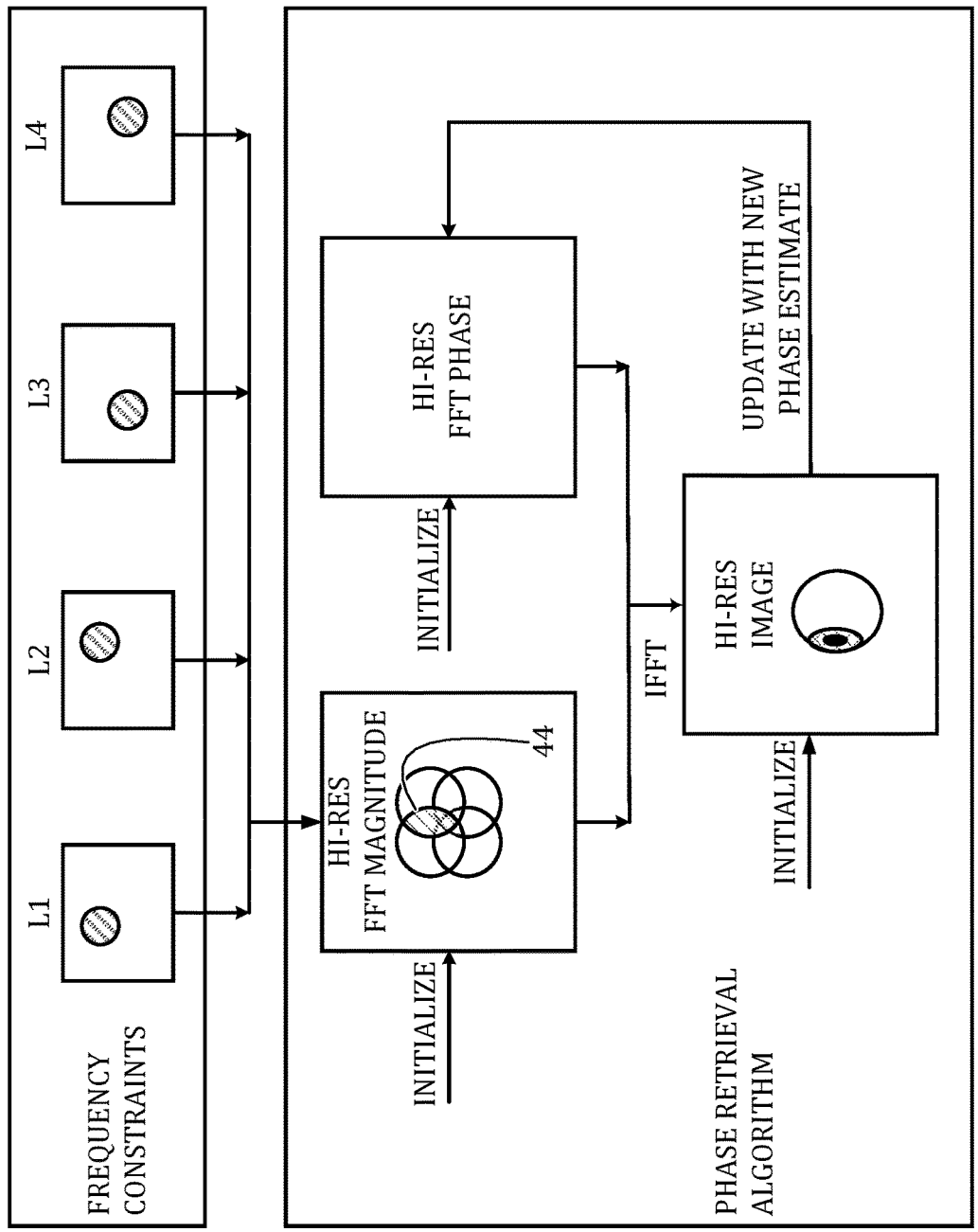
FIG. 6 is a schematic illustration of aspects of the method of FIG. 4.

At 42A of method 40, the image engine computes a Fourier-magnitude map and a Fourier-phase map for every component image of the subject. FIG. 5 illustrates an example overlay of Fourier-magnitude maps based on component images. In the illustrated example, the component images are concurrently acquired under single point illumination. The four overlapping circles correspond, accordingly, to the Fourier-magnitude maps derived from the four quadrants of image-sensor array 16 (regions 30A through 30D). However, the same principles apply to component images acquired sequentially, as noted above. FIG. 6 provides a companion, schematic illustration of some aspects of method 40.

At 42B the image engine attenuates (e.g., to zero) all Fourier-magnitude values outside of the spatial-frequency response function defined by the bandwidth of the physical aperture of the camera system and the spatial-frequency offset shift based on the illumination angle. The attenuation removes Fourier-transform artifacts and residuals that lie outside of the bandwidth of the system. These frequency constraints are applied iteratively during phase retrieval, placed in the correct location of the higher-resolution frequency space (vide infra).

At 42C the image engine initializes the phase-retrieval algorithm. In some examples, initialization includes, at 42D, creating an initial combined image by up-sampling one of the component images, and, at 42E and 42F, creating initial Fourier-magnitude and Fourier-phase maps for the initial combined image. These three 'high-resolution' data sets provide the working space in which lower-resolution content from the component images will be incorporated iteratively.

At 42G iterative phase retrieval begins, with the image engine applying the frequency constraint for the first component image. At 42H the image engine updates the combined image by enacting an inverse Fourier transform on the updated frequency spectrum with the latest constraint applied, and using the current Fourier-phase map of the combined image. This constraint is imposed in the overlap regions of the transformed component images as each new spatial-frequency ring is added to the higher-resolution FFT space. FIG. 6 highlights one of six overlap regions 44 in the higher-resolution FFT space. The corresponding phase in the overlap region should be the same for each of the overlapping component images. Therefore, as content from each additional transformed component image is added to the high resolution image, the higher resolution phase is guided into convergence. Steps 42G and 42H are now repeated using the frequency constraints for the remaining component images, one at a time.

At 42H the image engine determines whether the Fourier-phase map of the combined image has stabilized to a desired state. If so, then the iterations stop and the image engine returns the current combined image as the enhanced image.

No aspect of the foregoing drawings or description should be understood in a limiting sense, for numerous variations, extensions, and omissions are also envisaged. For instance, while the illustrated camera system includes a series of lamps that may be energized one at a time, the lamps may also be energized in any suitable combination. In still other examples, a camera system may include only one lamp, such that the angle of illumination of the subject is constant.

The methods herein may be tied to a computer system of one or more computing devices. Such methods and processes may be implemented as an application program or service, an application programming interface (API), a library, and/or other computer-program product.

Figure 7:
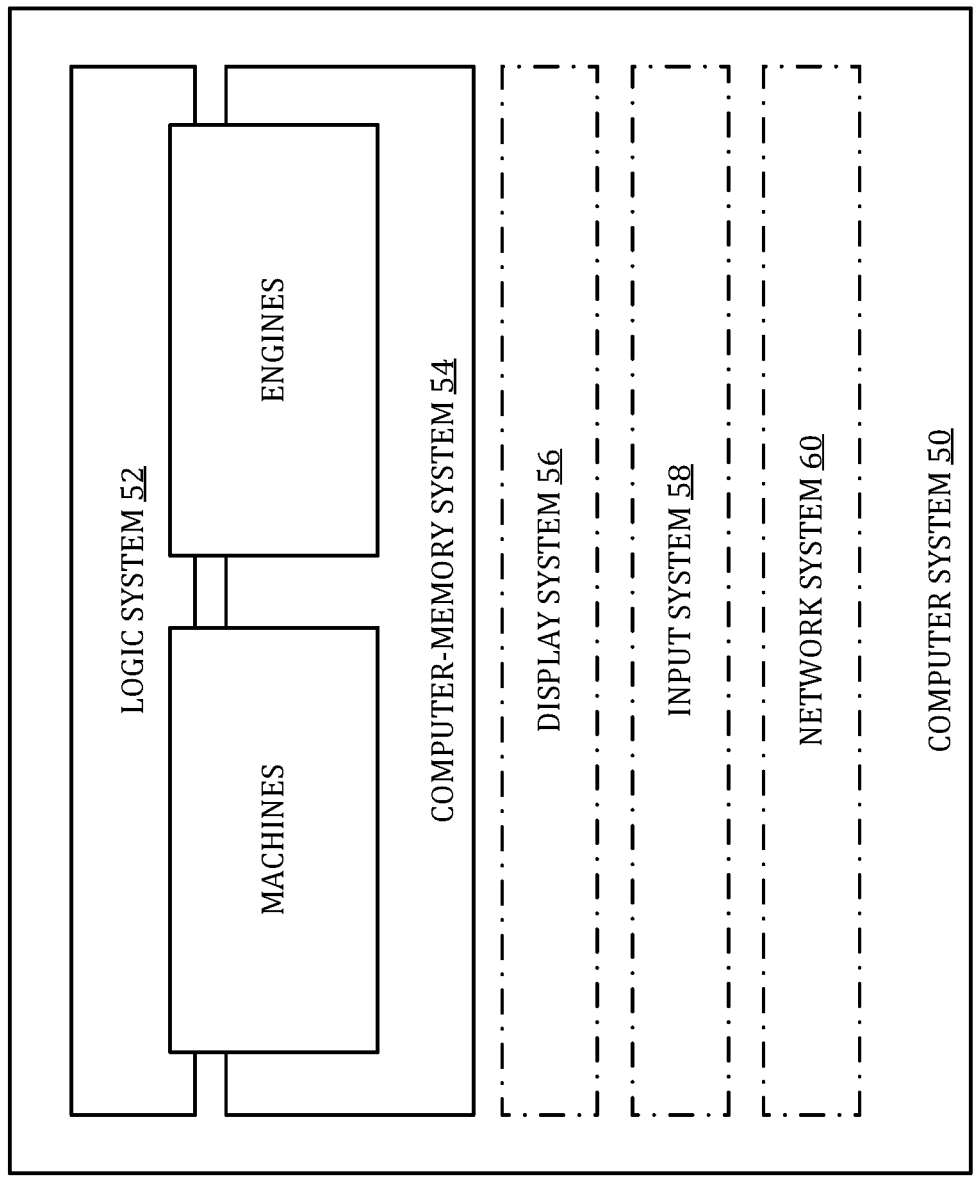
FIG. 7 shows aspects of an example computer system.

FIG. 7 provides a schematic representation of a computer system 50 configured to provide some or all of the computer system functionality disclosed herein. Computer system 50 includes a logic system 52 and a computer-memory system 54. Computer system 50 may optionally include a display system 56, an input system 58, a network system 60, and/or other systems not shown in the drawings.

Logic system 52 includes one or more physical devices configured to execute instructions. For example, the logic system may be configured to execute instructions that are part of at least one operating system (OS), application, service, and/or other program construct. The logic system may include at least one hardware processor (e.g., microprocessor, central processor, central processing unit (CPU) and/or graphics processing unit (GPU)) configured to execute software instructions. Additionally or alternatively, the logic system may include at least one hardware or firmware device configured to execute hardware or firmware instructions. A processor of the logic system may be single-core or multi-core, and the instructions executed thereon may be configured for sequential, parallel, and/or distributed processing. Individual components of the logic system optionally may be distributed among two or more separate devices, which may be remotely located and/or configured for coordinated processing.

Computer-memory system 54 includes at least one physical device configured to temporarily and/or permanently hold computer system information, such as data and instructions executable by logic system 52. When the computer-memory system includes two or more devices, the devices may be collocated or remotely located. Computer-memory system 54 may include at least one volatile, nonvolatile, dynamic, static, read/write, read-only, random-access, sequential-access, location-read addressable, file-read addressable, and/or content-read addressable computer-memory device. Computer-memory system 54 may include at least one removable and/or built-in computer-memory device. When the logic system executes instructions, the state of computer-memory system 54 may be transformed—e.g., to hold different data.

Aspects of logic system 52 and computer-memory system 54 may be integrated together into one or more hardware-logic components. Any such hardware-logic component may include at least one program- or application-specific integrated circuit (PASIC/ASIC), program- or application-specific standard product (PSSP/ASSP), system-on-a-chip (SOC), or complex programmable logic device (CPLD), for example.

Logic system 52 and computer-memory system 54 may cooperate to instantiate one or more logic machines or engines. As used herein, the terms 'machine' and 'engine' each refer collectively to a combination of cooperating hardware, firmware, software, instructions, and/or any other components that provide computer system functionality. In other words, machines and engines are never abstract ideas and always have a tangible form. A machine or engine may be instantiated by a single computing device, or a machine or engine may include two or more subcomponents instantiated by two or more different computing devices. In some implementations, a machine or engine includes a local component (e.g., a software application executed by a computer system processor) cooperating with a remote component (e.g., a cloud computing service provided by a network of one or more server computer systems). The software and/or other instructions that give a particular machine or engine its functionality may optionally be saved as one or more unexecuted modules on one or more computer-memory devices.

Machines and engines (as used throughout the above description) may be implemented using any suitable combination of machine learning (ML) and artificial intelligence (AI) techniques. Non-limiting examples of techniques that may be incorporated in an implementation of one or more machines include support vector machines, multi-layer neural networks, convolutional neural networks (e.g., spatial convolutional networks for processing images and/or video, and/or any other suitable convolutional neural network configured to convolve and pool features across one or more temporal and/or spatial dimensions), recurrent neural networks (e.g., long short-term memory networks), associative memories (e.g., lookup tables, hash tables, bloom filters, neural Turing machines and/or neural random-access memory) unsupervised spatial and/or clustering methods (e.g., nearest neighbor algorithms, topological data analysis, and/or k-means clustering), and/or graphical models (e.g., (hidden) Markov models, Markov random fields, (hidden) conditional random fields, and/or AI knowledge bases)).

When included, display system 56 may be used to present a visual representation of data held by computer-memory system 54. The visual representation may take the form of a graphical user interface (GUI) in some examples. The display system may include one or more display devices utilizing virtually any type of technology. In some implementations, display system may include one or more virtual-, augmented-, or mixed reality displays.

When included, input system 58 may comprise or interface with one or more input devices. An input device may include a sensor device or a user input device. Examples of user input devices include a keyboard, mouse, or touch screen.

When included, network system 60 may be configured to communicatively couple computer system 50 with one or more other computer systems. The network system may include wired and/or wireless communication devices compatible with one or more different communication protocols. The network system may be configured for communication via personal-, local- and/or wide-area networks.

In conclusion, one aspect of this disclosure is directed to a camera system comprising a lamp configured to emit light, a lamp driver configured to energize the lamp, an image-sensor array configured to acquire image data, a lenslet array, and an image engine. The lenslet array includes a plurality of lenslets arranged laterally over the image-sensor array and configured to focus the light, reflected from a subject, onto the image-sensor array. The image engine is configured to receive the image data from the image-sensor array, resolve the image data into a plurality of component images, and return an enhanced image based on the plurality of component images, the enhanced image having enhanced spatial resolution relative to any of the component images. As noted hereinabove, the lenslet array provides the technical benefit of enabling a plurality of component images of different reflection-angle content to be captured at once. Thus, the reflection-angle space can be filled in using fewer lamps and less time than if only one objective lens were used. This feature reduces the cost and complexity of the camera system by reducing the number of lamps and improves performance by reducing the overall time of acquisition of an enhanced-resolution image. The image engine provides the technical benefit of forming an image of higher resolution than would ordinarily be possible with the fixed physical-aperture size and number of sensors of the image-sensor array.

In some implementations each lenslet of the lenslet array is configured to focus the light onto a different region of the image-sensor array, and the plurality of component images include images acquired concurrently on different regions of the image-sensor array. In some implementations the lamp is one of a series of lamps, the lamp driver is configured to energize the series of lamps in a sequence, and the image data includes a corresponding sequence of component images acquired while a different lamp or combination of lamps is energized. This feature provides an additional technical benefit of extending the number of component images beyond the number of lenslets of the lenslet array, and expanding the reflection-angle space spanned by the component images. This further improves the spatial resolution of the enhanced image. In some implementations each lamp of the series of lamps is configured to illuminate a locus of the subject from a different illumination angle, causing the light to reflect onto the lenslet array at a different reflection angle. In some implementations the series of lamps comprise N lamps, the lenslet array comprises M lenslets, and the plurality of component images comprise M×N component images. In some implementations the image engine is further configured to: transform each of the plurality of component images onto a spatial-frequency domain; combine the plurality of component images in spatial-frequency space to obtain a combined image of broader spatial frequency than any of the component images; and inverse transform the combined image to obtain the enhanced image. These features provide the technical benefit of enacting a data-transformation procedure (resolution enhancement) using efficient applied mathematics. In particular, combination of transformed component images in the spatial-frequency domain is more efficient than any hypothetical strategy enacted in pixel space. The increase in processing efficiency makes the overall approach a practical one—limiting the use of computer resources, etc. In some implementations combining the plurality of component images includes accumulating spatial-frequency content from each component image into the combined image using a phase estimate derived from the enhanced image. In some implementations an effective aperture size for the enhanced image exceeds a physical aperture size of the lenslet array. This feature provides an additional technical benefit of limiting the size and manufacturing cost of a camera system configured for a given spatial resolution. For reasons noted hereinabove, the size of the physical aperture of a camera system drives both size and cost. In some implementations the lenslet array comprises a rectangular matrix of replicated lenslets. In some implementations the rectangular matrix is a two-by-two matrix. This feature provides an additional technical benefit of multiplication by four of the number of component images available with a single point of illumination. In some implementations the series of lamps includes eight lamps distributed around the image-sensor array in a plane parallel to the image-sensor array. This feature provides an additional technical benefit of multiplication by eight of the number of component images available from a single image capture. In some implementations the series of lamps is a series of light-emitting diodes (LEDs), and the image-sensor array is a complementary metal-oxide silicon (CMOS) array. In some implementations the camera system is arranged in a near-eye display device, and the subject comprises a human eye. In some implementations the image engine is further configured to enact iris recognition based on the enhanced image. This feature provides the additional technical benefit of enabling the resolution-demanding task of iris recognition using camera hardware resources of lower native resolution—such as resources that may be appropriate for gaze tracking.

Another aspect of this disclosure is directed to a method comprising: energizing a lamp of a camera system, the lamp emitting light onto a subject; acquiring image data recording the light, reflected from the subject and focused by a lenslet array comprising a plurality of lenslets arranged laterally over an image-sensor array; resolving the image data into a plurality of component images, and returning an enhanced image based on the plurality of component images, the enhanced image having enhanced spatial resolution relative to any of the component images. The lenslet array provides the technical benefit of enabling a plurality of component images of different reflection-angle content to be captured at once. Thus, the reflection-angle space can be filled in using fewer lamps and less time than if only one objective lens were used. This feature reduces the cost and complexity of the camera system by reducing the number of lamps and improves performance by reducing the overall time of acquisition of an enhanced-resolution image. The image engine provides the technical benefit of forming an image of higher resolution than would ordinarily be possible with the fixed physical-aperture size and number of sensors of the image-sensor array.

In some implementations the method further comprises transforming each of the plurality of component images onto a spatial-frequency domain; combining the plurality of component images in spatial-frequency space to obtain a combined image of broader spatial frequency than any of the component images; and inverse transforming the combined image to obtain the enhanced image. These features provide the technical benefit of enacting a data-transformation procedure (resolution enhancement) using efficient applied mathematics. In particular, combination of transformed component images in the spatial-frequency domain is more efficient than any hypothetical strategy enacted in pixel space. The increase in processing efficiency makes the overall approach a practical one—limiting the use of computer resources, etc. In some implementations combining the plurality of component images includes accumulating spatial-frequency content from each component image into the combined image using a phase estimate derived from the enhanced image. In some implementations an effective aperture size for the enhanced image exceeds a physical aperture size of the lenslet array. This feature provides an additional technical benefit of limiting the size and manufacturing cost of a camera system configured for a given spatial resolution. For reasons noted hereinabove, the size of the physical aperture of a camera system drives both size and cost.

Another aspect of this disclosure is directed to a camera system comprising a series of lamps configured to emit light, a lamp driver configured to energize the series of lamps, an image-sensor array configured to acquire image data, and a lenslet array. The lenslet array comprises a plurality of lenslets arranged laterally over the image-sensor array and configured to focus the light, reflected from a subject, onto the image-sensor array. Image data from the image-sensor array is provided to an image engine configured to resolve the image data into a plurality of component images, transform each of the plurality of component images onto a spatial-frequency domain, combine the plurality of component images in spatial-frequency space to obtain a combined image of broader spatial frequency than any of the component images, inverse transform the combined image to obtain an enhanced image of enhanced spatial resolution relative to any of the component images, and return the enhanced image. The lenslet array provides the technical benefit of enabling a plurality of component images of different reflection-angle content to be captured at once. Thus, the reflection-angle space can be filled in using fewer lamps and less time than if only one objective lens were used. This feature reduces the cost and complexity of the camera system by reducing the number of lamps and improves performance by reducing the overall time of acquisition of an enhanced-resolution image. The series of lamps provides an additional technical benefit of extending the number of component images beyond the number of lenslets of the lenslet array, and expanding the reflection-angle space spanned by the component images. This further improves the spatial resolution of the enhanced image.

In some implementations the lamp driver is configured to energize the series of lamps in a sequence, each of the series of lamps is configured to illuminate a locus of a subject from a different illumination angle, causing light to reflect onto the lenslet array at a different reflection angle, and the image data includes a corresponding sequence of images acquired while a different lamp or combination of lamps is energized.

This disclosure is presented by way of example and with reference to the attached drawing figures. Components, process steps, and other elements that may be substantially the same in one or more of the figures are identified coordinately and described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A camera system comprising:
a lamp configured to emit light;
a lamp driver configured to energize the lamp;
an image-sensor array configured to acquire image data;
a lenslet array including a plurality of lenslets arranged laterally over the image-sensor array and configured to focus the light, reflected from a subject, onto the image-sensor array; and
an image engine configured to:
receive the image data from the image-sensor array,
resolve the image data into a plurality of component images,
transform each of the plurality of component images onto a spatial-frequency domain,
combine the plurality of component images in spatial-frequency space to obtain a combined image of broader spatial frequency than any of the component images, including accumulating spatial-frequency content from each component image into the combined image,
inverse transform the combined image to obtain an enhanced image having enhanced spatial resolution relative to any of the component images, and
return the enhanced image, wherein combining the plurality of component images includes accumulating spatial-frequency content from each component image into the combined image using a phase estimate derived from the enhanced image.

2. The camera system of claim 1, wherein each lenslet of the lenslet array is configured to focus the light onto a different region of the image-sensor array, and wherein the plurality of component images include images acquired concurrently on different regions of the image-sensor array.

3. The camera system of claim 1, wherein the lamp is one of a series of lamps, wherein the lamp driver is configured to energize the series of lamps in a sequence, and wherein the image data includes a corresponding sequence of component images acquired while a different lamp or combination of lamps is energized.

4. The camera system of claim 3, wherein each lamp of the series of lamps is configured to illuminate a locus of the subject from a different illumination angle, causing the light to reflect onto the lenslet array at a different reflection angle.

5. The camera system of claim 3, wherein the series of lamps comprise N lamps, the lenslet array comprises M lenslets, and the plurality of component images comprise M×N component images.

6. The camera system of claim 1, wherein an effective aperture size for the enhanced image exceeds a physical aperture size of the lenslet array.

7. The camera system of claim 1, wherein the lenslet array comprises a rectangular matrix of replicated lenslets.

8. The camera system of claim 1 wherein the rectangular matrix is a two-by-two matrix.

9. The camera system of claim 1, further comprising a series of lamps including eight lamps distributed around the image-sensor array in a plane parallel to the image-sensor array.

10. The camera system of claim 1, further comprising a series of light-emitting diodes (LEDs), wherein the image-sensor array is a complementary metal-oxide silicon (CMOS) array.

11. The camera system of claim 1, wherein the camera system is arranged in a near-eye display device, and wherein the subject comprises a human eye.

12. The camera system of claim 1, wherein the image engine is further configured to enact iris recognition based on the enhanced image.

13. A method comprising:
    energizing a lamp of a camera system, the lamp emitting light onto a subject;
    acquiring image data recording the light, reflected from the subject and focused by a lenslet array comprising a plurality of lenslets arranged laterally over an image-sensor array;
    resolving the image data into a plurality of component images;
    transforming each of the plurality of component images onto a spatial-frequency domain;
    combining the plurality of component images in spatial-frequency space to obtain a combined image of broader spatial frequency than any of the component images, including accumulating spatial-frequency content from each component image into the combined image;
    inverse transforming the combined image to obtain an enhanced image having enhanced spatial resolution relative to any of the component images; and
    returning the enhanced image, wherein combining the plurality of component images includes accumulating spatial-frequency content from each component image into the combined image using a phase estimate derived from the enhanced image.

14. The method of claim 13, wherein an effective aperture size for the enhanced image exceeds a physical aperture size of the lenslet array.

15. A camera system comprising:
    a series of lamps configured to emit light;
    a lamp driver configured to energize the series of lamps;
    an image-sensor array configured to acquire image data; and
    a lenslet array comprising a plurality of lenslets arranged laterally over the image-sensor array and configured to focus the light, reflected from a subject, onto the image-sensor array;
    wherein the image-sensor array provides the image data to an image engine configured to:
        receive the image data from the image-sensor array,
        resolve the image data into a plurality of component images,
        transform each of the plurality of component images onto a spatial-frequency domain,
        combine the plurality of component images in spatial-frequency space to obtain a combined image of broader spatial frequency than any of the component images, wherein combining the plurality of component images includes accumulating spatial-frequency content from each component image into the combined image using a phase estimate,
        inverse transform the combined image to obtain an enhanced image of enhanced spatial resolution relative to any of the component images, and
        return the enhanced image, the phase estimate being derived from the enhanced image.

16. The camera system of claim 15, wherein the lamp driver is configured to energize the series of lamps in a sequence, wherein each of the series of lamps is configured to illuminate a locus of a subject from a different illumination angle, causing light to reflect onto the lenslet array at a different reflection angle, and wherein the image data includes a corresponding sequence of images acquired while a different lamp or combination of lamps is energized.

* * * * *